(12) United States Patent
Wintrode et al.

(10) Patent No.: US 11,373,657 B2
(45) Date of Patent: Jun. 28, 2022

(54) SYSTEM AND METHOD FOR SPEAKER IDENTIFICATION IN AUDIO DATA

(71) Applicant: Raytheon Applied Signal Technology, Inc., Sunnyvale, CA (US)

(72) Inventors: Jonathan C. Wintrode, Annapolis, MD (US); Nicholas J. Hinnerschitz, Annapolis, MD (US); Aleksandr R. Jouravlev, Washington, DC (US)

(73) Assignee: Raytheon Applied Signal Technology, Inc., Sunnyvale, CA (US)

( * ) Notice: Subject to any disclaimer, the term of this patent is extended or adjusted under 35 U.S.C. 154(b) by 0 days.

(21) Appl. No.: 16/864,856

(22) Filed: May 1, 2020

(65) Prior Publication Data

US 2021/0343294 A1   Nov. 4, 2021

(51) Int. Cl.
*G10L 17/02* (2013.01)
*G10L 17/00* (2013.01)
(Continued)

(52) U.S. Cl.
CPC ............ *G10L 17/02* (2013.01); *G06N 3/0454* (2013.01); *G10L 17/00* (2013.01); *G10L 17/06* (2013.01); *G10L 17/18* (2013.01)

(58) Field of Classification Search
CPC ......... G10L 17/02; G10L 17/00; G10L 17/18; G10L 17/06; G06N 3/0454
(Continued)

(56) References Cited

U.S. PATENT DOCUMENTS

| 6,542,869 B1 * | 4/2003 | Foote | G06F 16/634 704/E15.005 |
| 7,337,115 B2 * | 2/2008 | Liu | G10L 15/26 704/231 |

(Continued)

FOREIGN PATENT DOCUMENTS

WO   2016189307 A1   12/2016

OTHER PUBLICATIONS

He et al., "Streaming End-to-End Speech Recognition for Mobile Devices," ICASSP 2019-2019 IEEE International Conference on Acoustics, Speech and Signal Processing (ICASSP), May 12-17, 2019.
(Continued)

*Primary Examiner* — Edwin S Leland, III
(74) *Attorney, Agent, or Firm* — Burns & Levinson LLP; Joseph M. Maraia (57) ABSTRACT

A system for identifying audio data includes a feature extraction module receiving unknown input audio data and dividing the unknown input audio data into a plurality of segments of unknown input audio data. A similarity module receives the plurality of segments of the unknown input audio data and receives known audio data from a known source, the known audio data being divided into a plurality of segments of known audio data. The similarity module performs comparisons between the segments of unknown input audio data and respective segments of known audio data and generates a respective plurality of similarity values representative of similarity between the segments of the comparisons, the comparisons being performed serially. The similarity module terminates the comparisons if the similarity values indicate insufficient similarity between the segments of the comparisons, prior to completing comparisons for all segments of the unknown input audio data.

12 Claims, 11 Drawing Sheets

(51) Int. Cl.
*G10L 17/06* (2013.01)
*G10L 17/18* (2013.01)
*G06N 3/04* (2006.01)

(58) Field of Classification Search
USPC ........................................................ 704/246
See application file for complete search history.

(56) References Cited

U.S. PATENT DOCUMENTS

| | | | | |
|---|---|---|---|---|
| 7,437,284 | B1* | 10/2008 | Margulies | G10L 15/005 |
| | | | | 704/7 |
| 7,801,910 | B2 | 9/2010 | Houh et al. | |
| 10,388,272 | B1* | 8/2019 | Thomson | G06F 40/44 |
| 10,402,500 | B2* | 9/2019 | Chochowski | G10L 21/10 |
| 10,573,312 | B1* | 2/2020 | Thomson | G10L 15/22 |
| 11,176,934 | B1* | 11/2021 | Venkatesh Raman | |
| | | | | G10L 15/32 |
| 2001/0012998 | A1* | 8/2001 | Jouet | G10L 15/08 |
| | | | | 704/E15.014 |
| 2004/0083104 | A1* | 4/2004 | Liu | G10L 15/28 |
| | | | | 704/245 |
| 2006/0206310 | A1* | 9/2006 | Ravikumar | H04L 69/24 |
| | | | | 704/9 |
| 2007/0112837 | A1* | 5/2007 | Houh | G06F 16/583 |
| | | | | 707/E17.02 |
| 2010/0125448 | A1* | 5/2010 | Goswami | G06F 40/263 |
| | | | | 704/8 |
| 2010/0191530 | A1* | 7/2010 | Nakano | G10L 15/32 |
| | | | | 704/244 |
| 2012/0017146 | A1* | 1/2012 | Travieso | G06F 40/45 |
| | | | | 715/265 |
| 2012/0323573 | A1* | 12/2012 | Yoon | G09B 19/06 |
| | | | | 704/E15.001 |
| 2013/0311190 | A1* | 11/2013 | Reiner | G06Q 10/0639 |
| | | | | 704/270 |
| 2015/0095026 | A1 | 4/2015 | Bisani et al. | |
| 2015/0194147 | A1* | 7/2015 | Yoon | G09B 19/06 |
| | | | | 704/236 |
| 2015/0228279 | A1* | 8/2015 | Biadsy | G10L 15/197 |
| | | | | 704/235 |
| 2016/0042739 | A1* | 2/2016 | Cumani | G10L 17/06 |
| | | | | 704/239 |
| 2016/0240188 | A1* | 8/2016 | Seto | G10L 15/32 |
| 2016/0267904 | A1* | 9/2016 | Biadsy | G10L 15/08 |
| 2017/0011735 | A1* | 1/2017 | Kim | G10L 15/005 |
| 2017/0061002 | A1* | 3/2017 | Roblek | G06F 16/634 |
| 2017/0092266 | A1* | 3/2017 | Wasserblat | G10L 15/063 |
| 2017/0294192 | A1* | 10/2017 | Bradley | G10L 25/51 |
| 2017/0365251 | A1 | 12/2017 | Park | |
| 2018/0012594 | A1* | 1/2018 | Behzadi | G10L 15/14 |
| 2018/0053502 | A1* | 2/2018 | Biadsy | G10L 15/18 |
| 2018/0061412 | A1* | 3/2018 | Cho | G10L 15/22 |
| 2018/0068653 | A1* | 3/2018 | Trawick | G10L 15/16 |
| 2018/0174600 | A1* | 6/2018 | Chaudhuri | H04N 21/4666 |
| 2018/0342239 | A1* | 11/2018 | Baughman | G10L 15/005 |
| 2018/0357998 | A1* | 12/2018 | Georges | G10L 15/14 |
| 2018/0374476 | A1* | 12/2018 | Lee | G10L 15/183 |
| 2019/0108257 | A1* | 4/2019 | Lefebure | G06F 16/3329 |
| 2019/0138539 | A1* | 5/2019 | Moreno Mengibar | |
| | | | | G10L 15/197 |
| 2019/0304470 | A1* | 10/2019 | Ghaemmaghami | G10L 17/06 |
| 2019/0371318 | A1* | 12/2019 | Shukla | G10L 15/22 |
| 2019/0385589 | A1* | 12/2019 | Muramatsu | G10L 15/005 |
| 2020/0019492 | A1 | 1/2020 | Fei et al. | |
| 2020/0021949 | A1* | 1/2020 | Edge | G01S 5/0036 |
| 2020/0027444 | A1* | 1/2020 | Prabhavalkar | G10L 25/30 |
| 2020/0035739 | A1* | 1/2020 | Saito | H01L 31/02966 |
| 2020/0074992 | A1* | 3/2020 | Xiong | G10L 15/063 |
| 2020/0111476 | A1* | 4/2020 | Kamano | G10L 15/02 |
| 2020/0175961 | A1* | 6/2020 | Thomson | G10L 15/22 |
| 2020/0243077 | A1 | 7/2020 | Rao | |
| 2020/0243094 | A1* | 7/2020 | Thomson | G10L 15/26 |
| 2020/0293875 | A1* | 9/2020 | Zhang | G10L 21/0208 |
| 2020/0380215 | A1* | 12/2020 | Kannan | G06N 3/08 |
| 2020/0387677 | A1* | 12/2020 | Kim | G06F 40/40 |
| 2021/0055778 | A1 | 2/2021 | Myer et al. | |
| 2021/0232776 | A1* | 7/2021 | Kim | G06F 40/35 |
| 2021/0248421 | A1 | 8/2021 | Gao et al. | |

OTHER PUBLICATIONS

Chen et al., "Query-by-Example Keyword Spotting Using Long Short-Term Memory Networks," IEEE International Conference on Acoustics, Speech and Signal Processing (ICASSP), Apr. 19-24, 2015.
Zhang et al., "Unsupervised Spoken Keyword Spotting Via Segmental DTW on Gaussian Posteriorgrams," Proceedings of the Automatic Speech Recognition & Understanding (ASRU) Workshop, IEEE, 2009, 398-403.
Miller et al., "Rapid and Accurate Spoken Term Detection," Proceedings of Interspeech, ISCA, 2007, pp. 314-317.
International Search Report and Written Opinion for International Application No. PCT/US2020/066298 dated Mar. 26, 2021.
Snyder et al., "X-Vectors: Robust DNN Embeddings for Speaker Recognition," Center for Language and Speech Processing & Human Language Technology Center of Excellence, The John Hopkins University, Baltimore, Maryland, USA.
Snyder et al., "X-vectors: Robust DNN embeddings for speaker recognition," in Proc. IEEE ICASSP, 2018.
Dehak et al., "Front-end factor analysis for speaker verification," IEEE Transactions on Audio, Speech, and Language Processing, vol. 19, No. 4, pp. 788-798, 2011.
Kinnunen, et al., "Real-time speaker identification and verification." IEEE Transactions on Audio, Speech, and Language Processing, vol. 14, No. 1, 277-288, 2005.
Kinnunen et al., "A speaker pruning algorithm for real-time speaker identification," in International Conference on Audio-and Video-Based Biometric Person Authentication. Springer, 639-646, 2003.
Sarka et al., "Fast Approach to Speaker Identification for Large Population using MLLR and Sufficient Statistics," in 2010 National Conference on Communications (NCC) IEEE, 1-5, 2010.
Schmidt et al., "Large-scale Speaker Identification," in Proc. of International Conference on Acoustics, Speech and Signal Processing (ICASSP) IEEE, 1650-1654, 2014.
Zhu et al., "Self-attentive Speaker Embeddings for Text-Independent Speaker Verification," Interspeech, 2018.
David Snyder, "SRE16 Xvector Model," http://kaldi-asr.org/models/m3, 2017, Accessed: Oct. 10, 2018.
Bisandu et al., "Clustering News Articles Using Efficient Similarity Measure and N-Grams," Int. J. Knowledge Engineering and Data Mining, vol. 5, No. 4, 2018, pp. 333-348 (Year: 2018).

* cited by examiner

SYSTEM AND METHOD FOR SPEAKER IDENTIFICATION IN AUDIO DATA

BACKGROUND

1. Technical Field

The present disclosure is related to audio data processing and, in particular, to a system and method for identifying a speaker in audio data which reduce processing time and improve identification efficiency and throughput.

2. Discussion of Related Art

In audio data processing, it is often desirable to identify a speaker in the audio data. Speaker identification is the labeling of an extent of audio data (recording or stream) with the identity of a specific person whose speech is contained within the audio. Conventionally, speaker identification can require a large amount of processing resources due to the amount of audio data typically being analyzed to make the identification determination.

SUMMARY

According to one aspect, a system for identifying audio data is provided. The system includes a feature extraction module for receiving an unknown input audio data stream from a source to be identified and dividing the unknown input audio data stream into a plurality of segments of unknown input audio data. A similarity module receives the plurality of segments of the unknown input audio data and receives a known audio data stream from a known source, the known audio data stream being divided into a plurality of segments of known audio data. The similarity module performs comparisons between the segments of unknown input audio data and respective segments of known audio data and generates a respective plurality of similarity values representative of similarity between the segments of the comparisons, the comparisons being performed serially. The similarity module terminates the comparisons if the similarity values indicate insufficient similarity between the segments of the comparisons, prior to completing comparisons for all segments of the unknown input audio data.

In some exemplary embodiments, each segment of unknown audio data comprises an unknown data vector comprising a plurality of data values associated with the segment of unknown input audio data; and each segment of known audio data comprises a known data vector comprising a plurality of data values associate with the segment of known audio data. The similarity module, in generating each similarity value, can compute a vector distance between the unknown data vector and the known data vector of the segments of the comparison being performed.

In some exemplary embodiments, the feature extraction module comprises a deep neural network.

In some exemplary embodiments, the similarity module performs a probabilistic linear discriminant analysis (PLDA) in generating the plurality of similarity values.

In some exemplary embodiments, extents of each segment are defined by a time duration. In some exemplary embodiments, extents of each segment are defined by a quantity of data in the segment.

According to another aspect, a method for identifying audio data is provided. The method includes: (i) receiving, at a feature extraction module, an unknown input audio data stream from a source to be identified and dividing the unknown input audio data stream into a plurality of segments of unknown input audio data; and (ii) receiving, at a similarity module, the plurality of segments of the unknown input audio data and receiving, at the similarity module, a known audio data stream from a known source, the known audio data stream being divided into a plurality of segments of known audio data, the similarity module performing comparisons between the segments of unknown input audio data and respective segments of known audio data and generating a respective plurality of similarity values representative of similarity between the segments of the comparisons, the comparisons being performed serially, the similarity module terminating the comparisons if the similarity values indicate insufficient similarity between the segments of the comparisons, prior to completing comparisons for all segments of the unknown input audio data.

In some exemplary embodiments, each segment of unknown audio data comprises an unknown data vector comprising a plurality of data values associated with the segment of unknown input audio data; and each segment of known audio data comprises a known data vector comprising a plurality of data values associate with the segment of known audio data. In some exemplary embodiments, the similarity module, in generating each similarity value, computes a vector distance between the unknown data vector and the known data vector of the segments of the comparison being performed.

In some exemplary embodiments, the feature extraction module comprises a deep neural network.

In some exemplary embodiments, the similarity module performs a probabilistic linear discriminant analysis (PLDA) in generating the plurality of similarity values.

In some exemplary embodiments, extents of each segment are defined by a time duration. In some exemplary embodiments, extents of each segment are defined by a quantity of data in the segment.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Speaker identification (SID) is the labeling of an extent of audio data (recording or stream) with the identity of a specific target person whose speech is contained within the audio. Approaches to SID typically include an offline component (training) and a runtime component (recognition). Current SID systems perform recognition by computing a low-dimensional feature vector representing the entire recording duration and comparing the feature vector, using a learned similarity function, to a previously computed feature vector from a known example of the target speaker, which is generated during training, and which is commonly known as the enrollment vector. The similarity between the two vectors is reported as the probability of detection, which is compared to a user-supplied threshold, the result of this comparison being used to determine whether to label or not label the recording with the enrollment speaker's identity. Some modern approaches use deep neural networks to extract data-driven features that enable comparison of new audio to audio from known speakers. The approach of the present disclosure reduces the amount of audio data needed at runtime to make a correct non-target designation, which directly reduces the processing cost and resources in terms of computation cycles.

According to the present disclosure, this improvement is achieved by an incremental computing approach that "fails fast" in asserting that a recording does not contain the identity of a target speaker before all audio is processed. Under the "fail fast" approach of the present disclosure, rather than use the entire audio recording, overall computation, which is proportional to the amount of audio processed, is reduced by computing the feature vector on increasing initial subsets of the unknown audio. The similarity function is applied to these vectors, and the trajectory of the distance function output is observed. If subsequent segments of audio fail to increase the similarity to the target speaker, the audio is rejected as being that of the known speaker, and processing is stopped early, i.e., before all of the audio data is processed. Typical conventional systems will make an identification decision only after computing over the entire audio file. The approach of the present disclosure stops processing early if an additional portion or segment or "chunk" of audio fails to reduce the system comparison function distance to the target speaker. The "fail fast" approach of the present disclosure can be applied to any speaker identification system using a feature-extraction/similarity-function paradigm.

Figure 4:
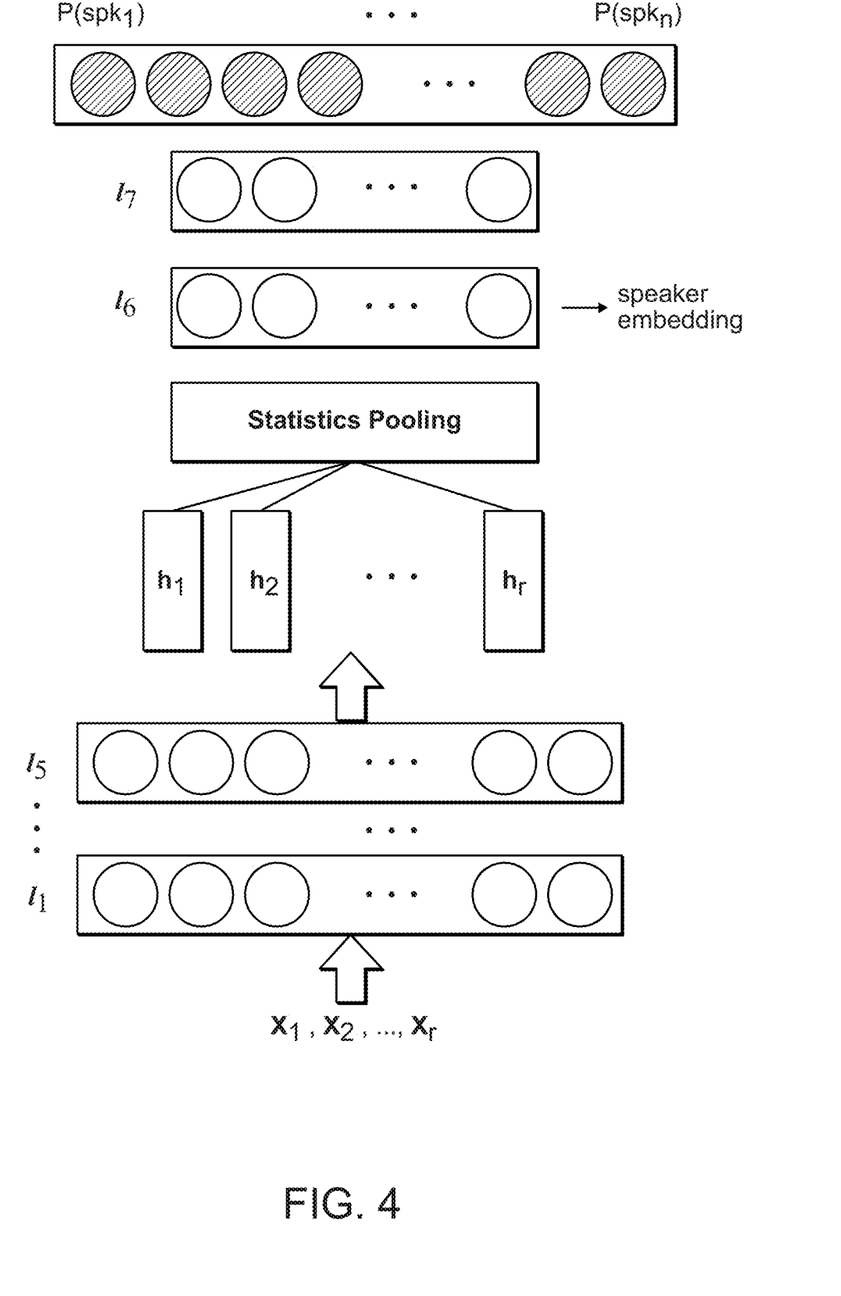
FIG. 4 includes a schematic functional block diagram which illustrates an X-vector neural network structure.

Thus, the approach of the present disclosure is an improvement to deep-learning-based approaches to speaker identification. Audio of variable length is converted, via a deep neural network, to a low-dimensional vector of numbers with the property that multiple audio samples from the same speaker will be close in the resulting vector space. The feature vector is extracted from one of the internal network layers, commonly described as a bottleneck layer, an example being shown as layer $l_6$ in FIG. 4, described in detail below. The output values of this layer become the feature vector for given input audio. These feature vectors are described as x-vectors, based on the work by Snyder et al, (cited below), which describes a successful neural network architecture applied to speaker identification. FIG. 4 is an illustration of Snyder's architecture, with the bottleneck layer/x-vector described as the "speaker embedding."

According to the disclosure, the identity of the target speaker is provided by an additional recording which is converted to the low-dimensional space, i.e., compute an enrollment x-vector. To speed up processing, the approach of the disclosure computes x-vectors on incremental portions of the unknown audio. The distance between the unknown recordings and enrollment x-vector is computed using, for example, a Probabilistic Linear Discriminative Analysis (PLDA). To reject non-target speakers, the trajectory of the PLDA distance is followed, such that, if the subsequent segments of audio fail to reduce the distance to the target speaker, the audio is rejected, and processing is stopped early.

Thus, according to the present disclosure, the use of a trajectory-based approach to reduce the expected computation for non-target speakers is implemented in a speaker identification system. By computing x-vectors (embeddings) on sequential segments of audio, the approach of the disclosure, processing can be stopped early when the distance fails to converge on the target speaker.

Figure 1:
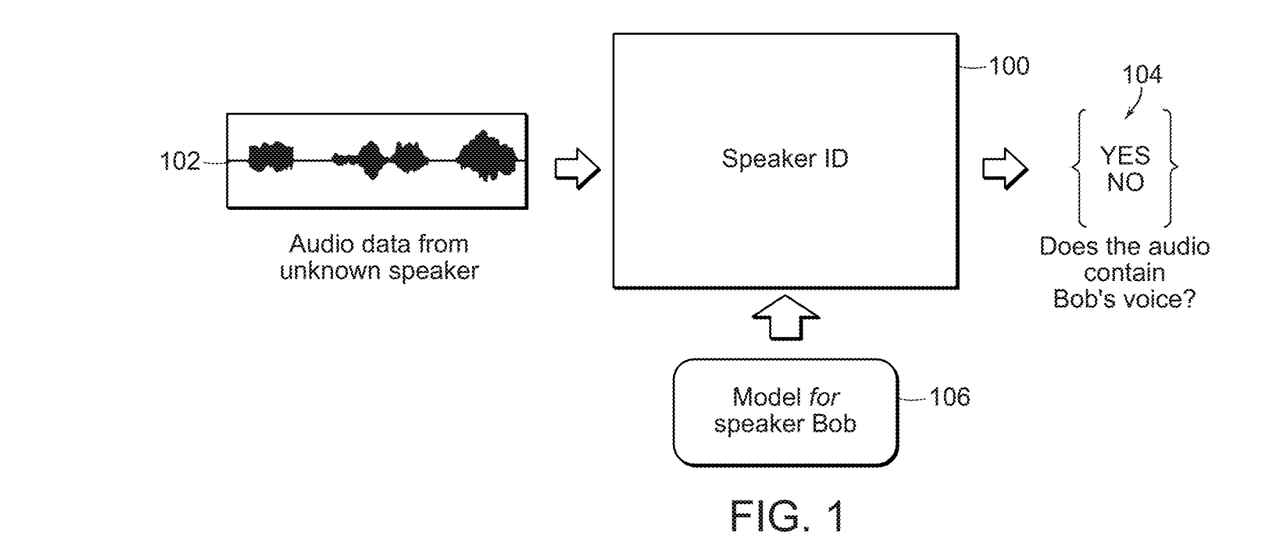
FIG. 1 includes a schematic functional block diagram of a speaker identification system, according to some exemplary embodiments.

FIG. 1 includes a schematic functional block diagram of a speaker identification system 100, according to some exemplary embodiments. Referring to FIG. 1, system 100 takes in audio data 102 from an unknown speaker of any length, which, in some particular exemplary embodiments, is in the form of a .wav file. System 100 also takes in a model or model data 106 for a known speaker, referred to herein as known speaker "Bob." Model 106 represents what makes the known speaker's voice distinct from others' voices. Output 104 from system 100 is a yes or no answer to the question as to whether audio data 102 from the unknown speaker contains the voice of the known speaker. That is, a yes output identifies the speaker in audio data 102 as being the known speaker of model 106.

Figure 2:
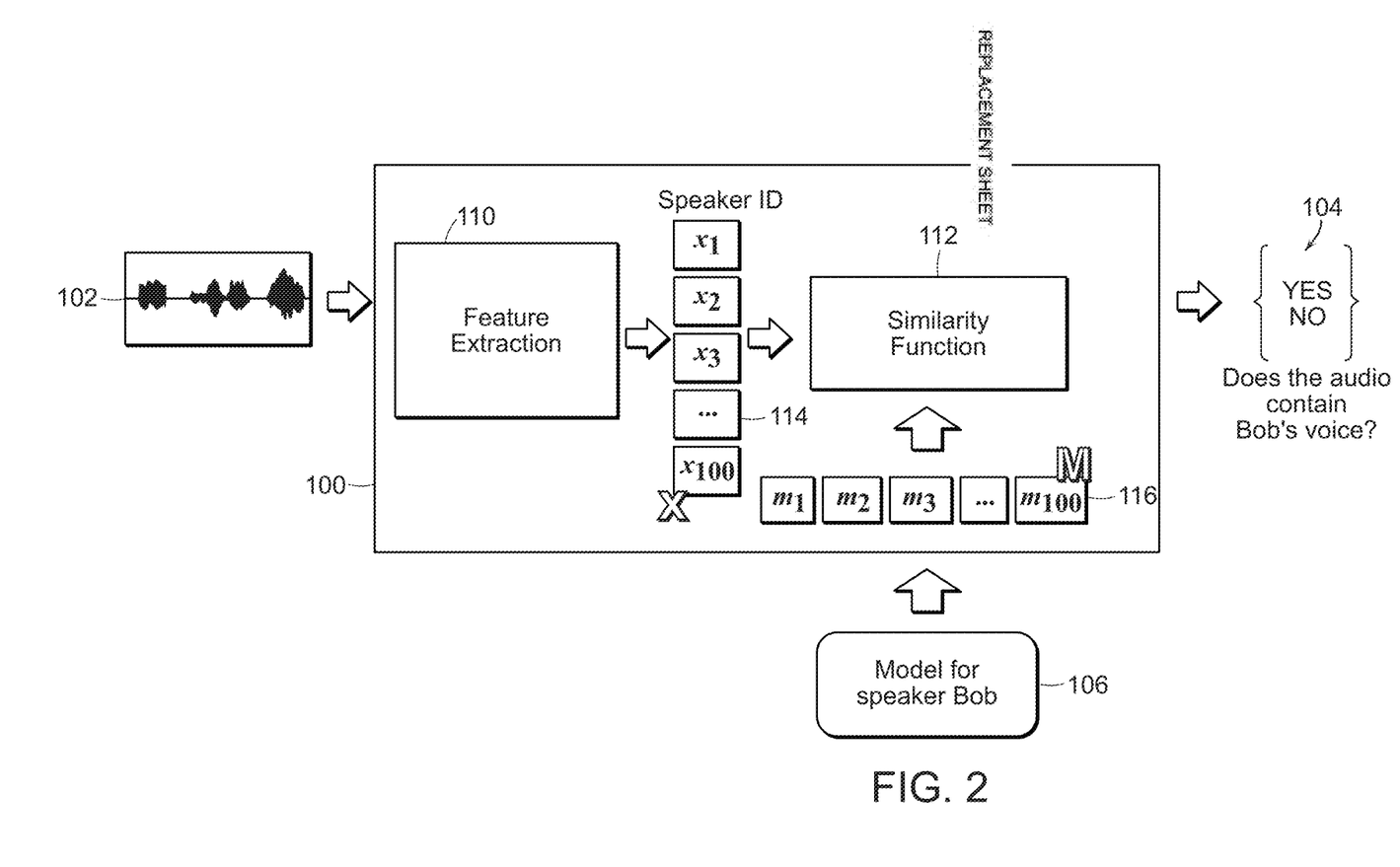
FIG. 2 includes a schematic functional block diagram illustrating speaker identification system of FIG. 1, according to some exemplary embodiments.

According to some exemplary embodiments, the approach to speaker identification is carried out in two stages, namely, a feature extraction stage and a similarity function stage. FIG. 2 includes a schematic functional block diagram illustrating speaker identification system 100 of FIG. 1, according to some exemplary embodiments. Referring to FIG. 2, speaker identification system 100 includes feature extraction module 110 and similarity function module 112. Audio input data 102 is provided to feature extraction module 110, which outputs a feature vector 114, denoted X, which in some exemplary embodiments is a fixed-length list of decimal values $x_i$. In some exemplary embodiments, feature X-vector 114 100 decimal values $x_1$, $x_2$, ..., $x_{100}$. X-vector 114 is then input to similarity function module 112, which measures the distance between feature X-vector 114 and known model data 106 M-vector 116. The "fail fast" approach of the present disclosure enhances any existing speaker identification system using the framework illustrated in FIG. 2.

It will be understood that either or both of feature extraction module 110 and similarity function module 112 include all of the processing capabilities required to carry out their individual functions and the overall functions of speaker identification system 100, as described herein in detail. These processing capabilities can be implemented in either or both modules 110, 112, and can include for example, one or more dedicated processors, memories, input/output devices, interconnection devices, and any other required devices or subsystems. Alternatively, these modules 110, 112 and system 100 can be implemented on a general purpose computer executing instructions to implement the technology described herein.

Feature Extraction module 110 takes audio 102 as input, and outputs a fixed-dimensional feature vector 114, i.e., X-vector as shown in FIG. 2. By fixed-dimensional, what is meant is that audio of any length (5 sec, 10 sec, 60 sec) is transformed into a vector made up of the same number of decimal values (typically 100-500).

$$X=\text{Extract}(\text{Audio}) \quad (1)$$

Similarity Module takes two vectors, i.e., unknown audio X-vector 114 and known model audio M-vector 116 as input and outputs a single numeric value that captures the "closeness" of the vectors. For example, a similarity function can be defined as:

$$S=\text{Similarity}(X,Y) \quad (2)$$

The intuition to this function is that the larger the value of S, the "closer", i.e., more similar, X and Y are. Two common geometric similarity functions are the Euclidian distance and Cosine similarity. The distance function is turned into a similarity function by subtracting from 1. The Euclidean distance in two dimensions is another name for the Pythagorean Theorem.

$$S=\text{Similarity}(X,Y) \quad (3)$$

$$S=1-\text{Distance}(X,Y) \quad (4)$$

$$S=1-\sqrt{(x_1-y_1)^2+(x_2-y_2)^2} \quad (5)$$

Figure 3A:
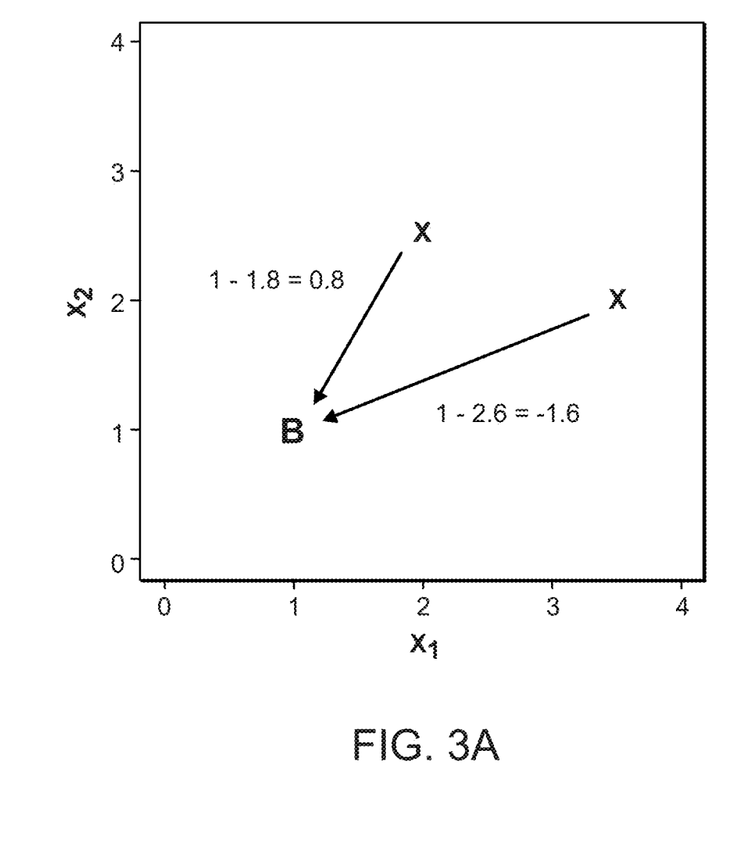
FIG. 3A is a curve illustrating an example of the Euclidean similarity function.
Figure 3B:
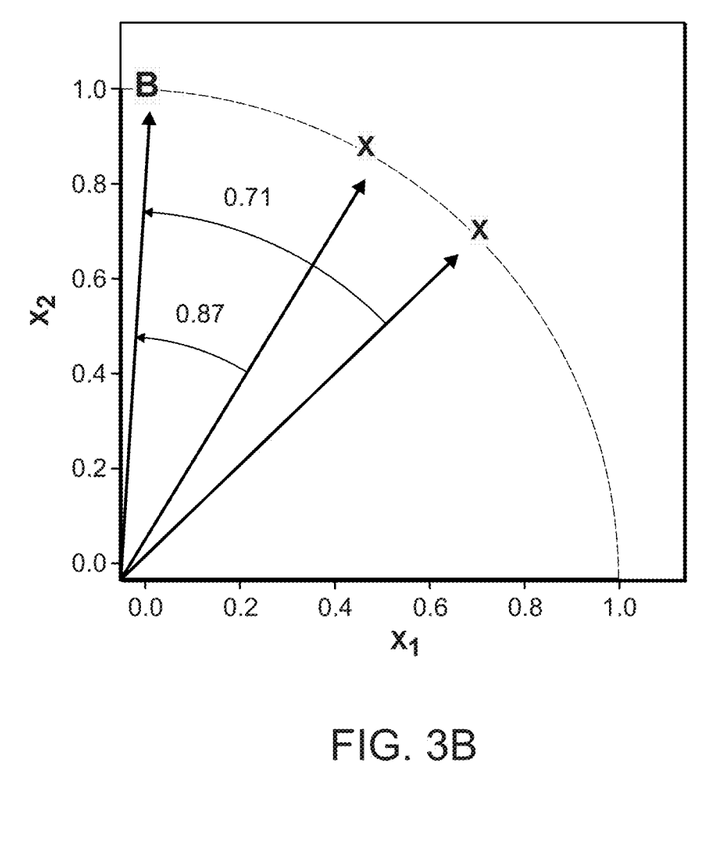
FIG. 3B is a curve illustrating an example of the Cosine similarity function.

The Cosine similarity captures the angle between two vectors and is a common metric used in high dimensions (greater than 3). FIG. 3A is a curve illustrating an example of the Euclidean similarity function, and FIG. 3B is a curve illustrating an example of the Cosine similarity function. The Cosine similarity quantifies the angle between the two X vectors, starting at the origin, (0,0), and terminating at the points marked X in FIG. 3B, and the vector terminating at the letter B, which represents the speaker model. These metrics are illustrated in two dimensions but have well-defined constructions in higher dimensions.

Probability functions, which return a value of 0 to 1, are also an intuitive set of similarity functions. If there is a probability that X and Y are the same, then the higher the probability S=P(X,Y), the "closer" or more similar X and Y are. In some exemplary embodiments, the similarity function 112 is Probabilistic Linear Discriminant Analysis (PLDA). PLDA is a probability-based metric that is a log-likelihood ratio, a comparison of two probabilities:

$$S = \log\left(\frac{P(\text{Speaker is Bob})}{P(\text{Speaker is not Bob})}\right) \quad (6)$$

PLDA and other log-likelihood ratios range from $-\infty$ to $\infty$, with 0 being the point at which we are completely unsure whether the unknown audio is Bob. Positive values indicate that it is more likely than not to be Bob, and negative values indicate that it is more likely than not that the unknown speaker is not Bob. This fits the requirement for a similarity metric in that larger values of S mean "closer" or "more similar."

According to some exemplary embodiments, feature extraction module 110 uses the neural network model developed at Johns Hopkins University, which is commonly referred to as an x-vector extractor. This model is well-known in the art, and is described in, for example, D. Snyder, et al., "X-vectors: Robust DNN embeddings for speaker recognition," in Proc. ICASSP, 2018. The x-vector neural network is an extraction function that satisfies the condition for equation 1 but is internally implemented with a neural network. FIG. 4 includes a schematic functional block diagram which illustrates the x-vector neural network structure. FIG. 4 is taken from FIG. 1 of Zhu, et al., "Self-attentive Speaker Embeddings for Text-Independent Speaker Verification," INTERSPEECH 2018. Referring to FIG. 4, the "speaker embedding" refers to the output feature vector, and X $(x_1, x_2, \ldots, x_T)$ refers to the audio feature input. The network of FIG. 4 is a typical feed-forward network, in that the inputs to each layer (denoted $l_1$ through $l_7$) are multiplied with a weight matrix, followed by the application of a nonlinear function to each output dimension. The output dimensionality for a layer is represented by the number of nodes in that layer. Each node has a weight associated with each input dimension, so each layer can be represented by an M×N dimensional weight matrix, where M is the number of inputs and N the number of outputs. The outputs of layer i are in turn used as the inputs to layer l+1. In FIG. 4, the "speaker embedding" is the output of layer $l_6$.

As illustrated below in detail, adding additional audio data into feature extraction module 110, without re-initializing the network, gives a better estimate of feature vector 114. It is related to the effect in statistical estimation that more data points give a more accurate measurement estimate.

The "fail fast" approach to using feature extraction 110 and similarity function 112 according to the exemplary embodiments, as described in connection with FIG. 2, inputs unknown audio 102 and known target speaker model audio 106 from a known speaker ("Bob"), and outputs a yes/no answer as to whether the known speaker's voice is in the unknown audio.

Figure 5:
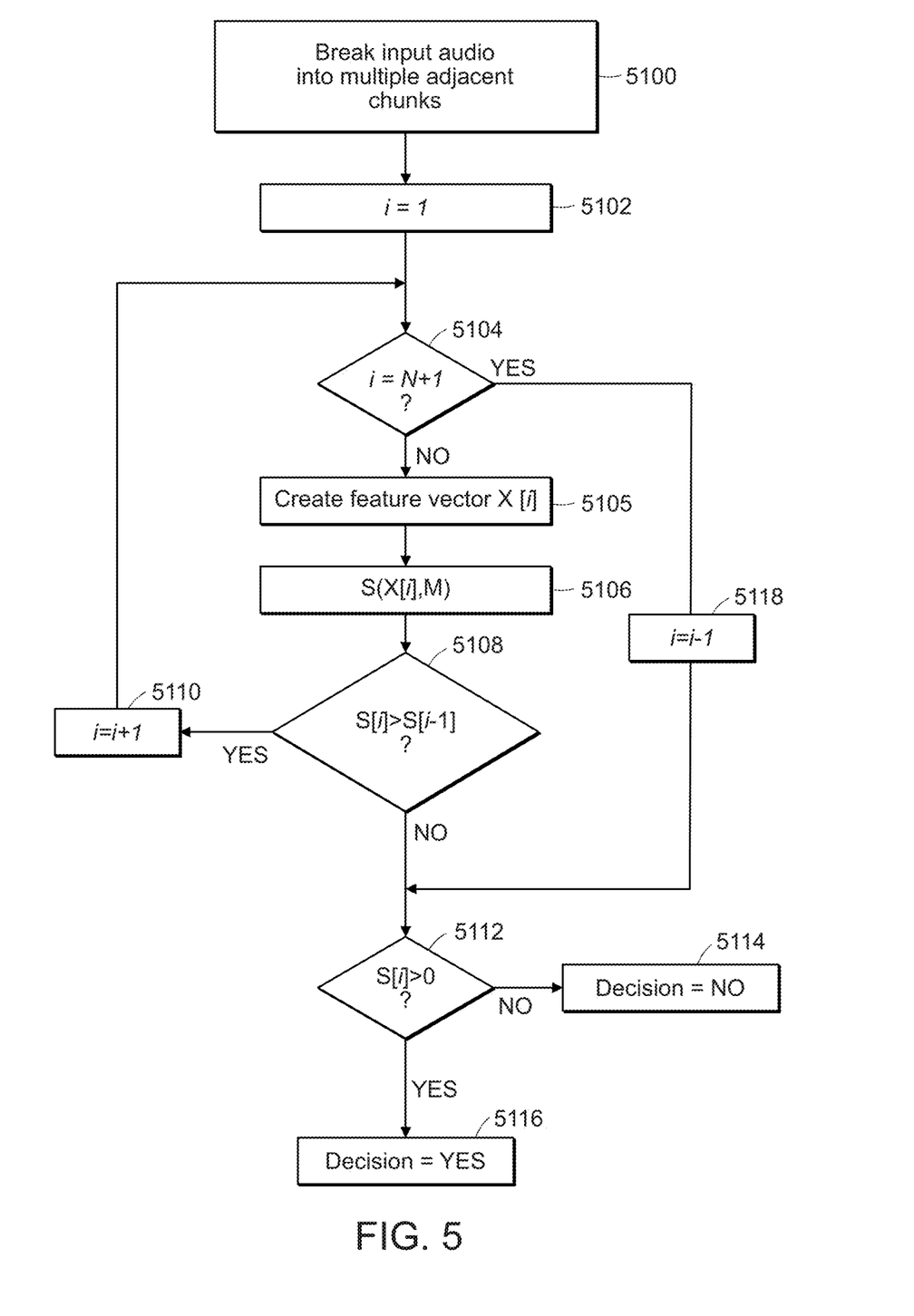
FIG. 5 includes a schematic logical flow diagram of the logical flow of an approach to speaker identification, according to some exemplary embodiments.

FIG. 5 includes a schematic logical flow diagram of the logical flow of the approach of the disclosure, according to some exemplary embodiments. Referring to FIG. 5, in step S100, unknown input audio A 102 is broken up or divided or segmented into multiple adjacent data "chunks" or segments c. In some exemplary embodiments, the segments c can be defined by a certain predetermined time duration. For example, each segment c can have a time duration of 5 seconds or 10 seconds or 15 seconds, or other time duration. In some embodiments, a quantity of N segments $c_i$ are generated as $c_1, c_2, \ldots, c_i, \ldots, c_N$.

In step S102, the index i of segments c is initialized to a value of 1. Next, in step S104, a determination is made as to whether the last segment, i.e., $c_N$, has been reached. If not, in step S105, a feature vector X[i] is generated for the current segment $c_i$ of audio data by feature extraction module 110. Next, in step S106, the similarity score S[i] between X[i] and target speaker model M-vector, S(X[i],M), is computed. In step 108, a determination is made as to whether the similarity for the current segment S[i] has increased over that of the previous segment S[i−1]. If so, then processing continues with the next segment, since it cannot yet be concluded that the unknown audio does not contain the voice of the known target speaker. To that end, the index i is incremented in step S110, and flow returns to the top of the loop at step S104.

If the determination in step S108 is that the current similarity has not increased over the previous similarity, then a determination is made in step S112 as to whether the current similarity score is positive, recalling that a positive similarity score indicates that it is more likely than not that the unknown audio includes the target speaker's voice. If the current similarity score is positive, then a YES decision is issued in step S116. That is, it is determined that the unknown audio includes the voice of the target speaker. However, if the similarity score is not positive, then a NO decision is issued in step S114. That is, it is determined that the unknown audio does not include the voice of the target speaker.

Hence, as long as the similarity score continues to increase from segment to segment, the process loops to check each segments until N segments have been processed. At that point, the determination in step S104, after the index i has been incremented in step S110, will be that index i has exceeded N. The index i will then be decremented in step S118 back to that of the last audio segment processed. Flow will then continue to step S112, where a determination is made as to whether the current, i.e., last, similarity score is positive. If the current similarity score is positive, then a YES decision is issued in step S116. However, if the similarity score is not positive, then a NO decision is issued in step S114.

As an alternative to the binary YES/NO decisions, some embodiments can interpret the final output, decision, or score as a probability. Speaker identification is often treated as a detection problem. The binary decision represents the application of a specific threshold. While the threshold of 0 is a natural one, given its probabilistic interpretation as a likelihood ratio test between two competing hypotheses, by outputting the raw similarity score, the system allows for external components to make their own thresholding decisions.

Figure 6A:
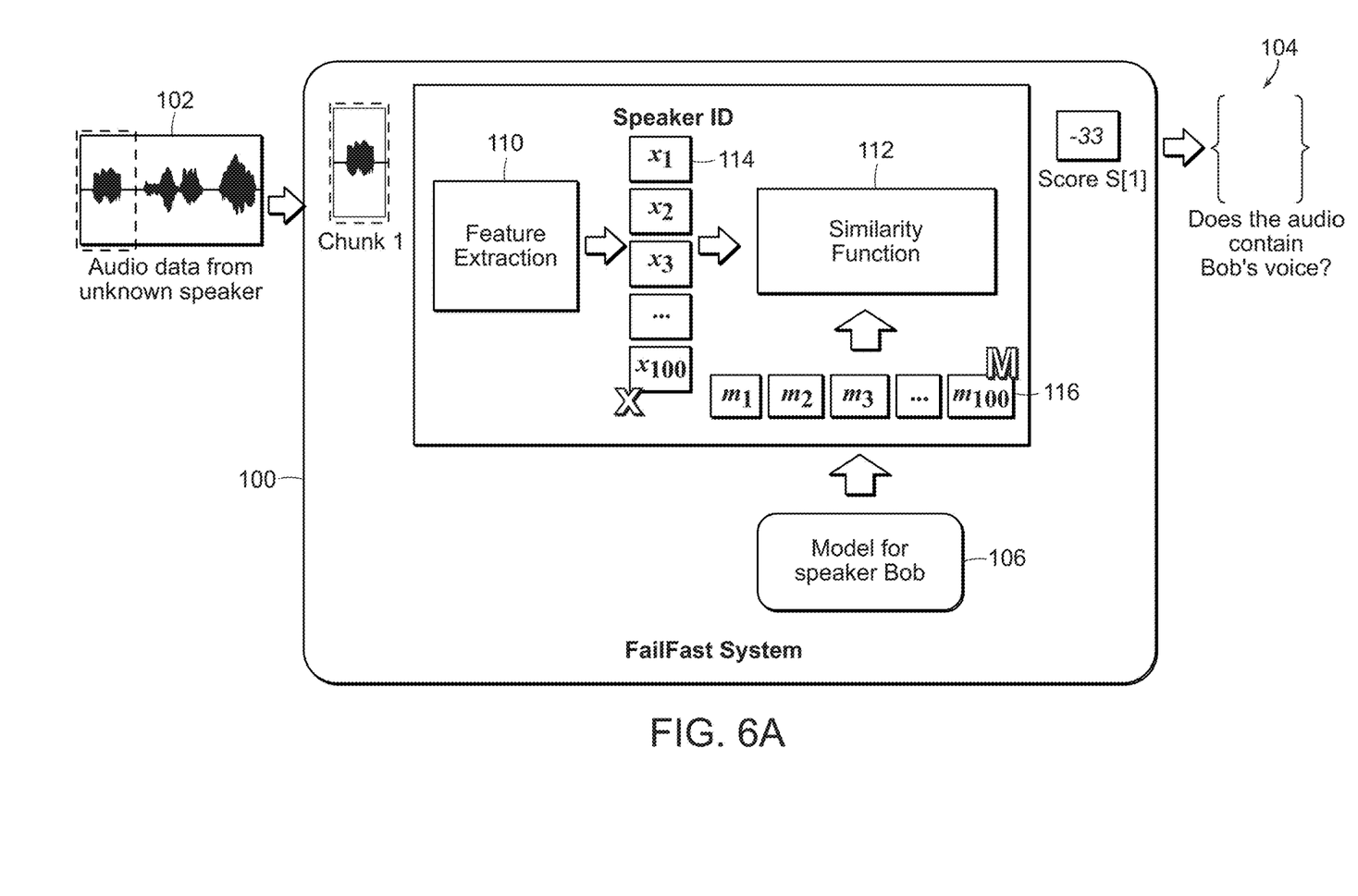
FIGS. 6A through 6C include schematic block diagrams which illustrate a positive identification of a target speaker in unknown audio, according to some exemplary embodiments.
Figure 6B:
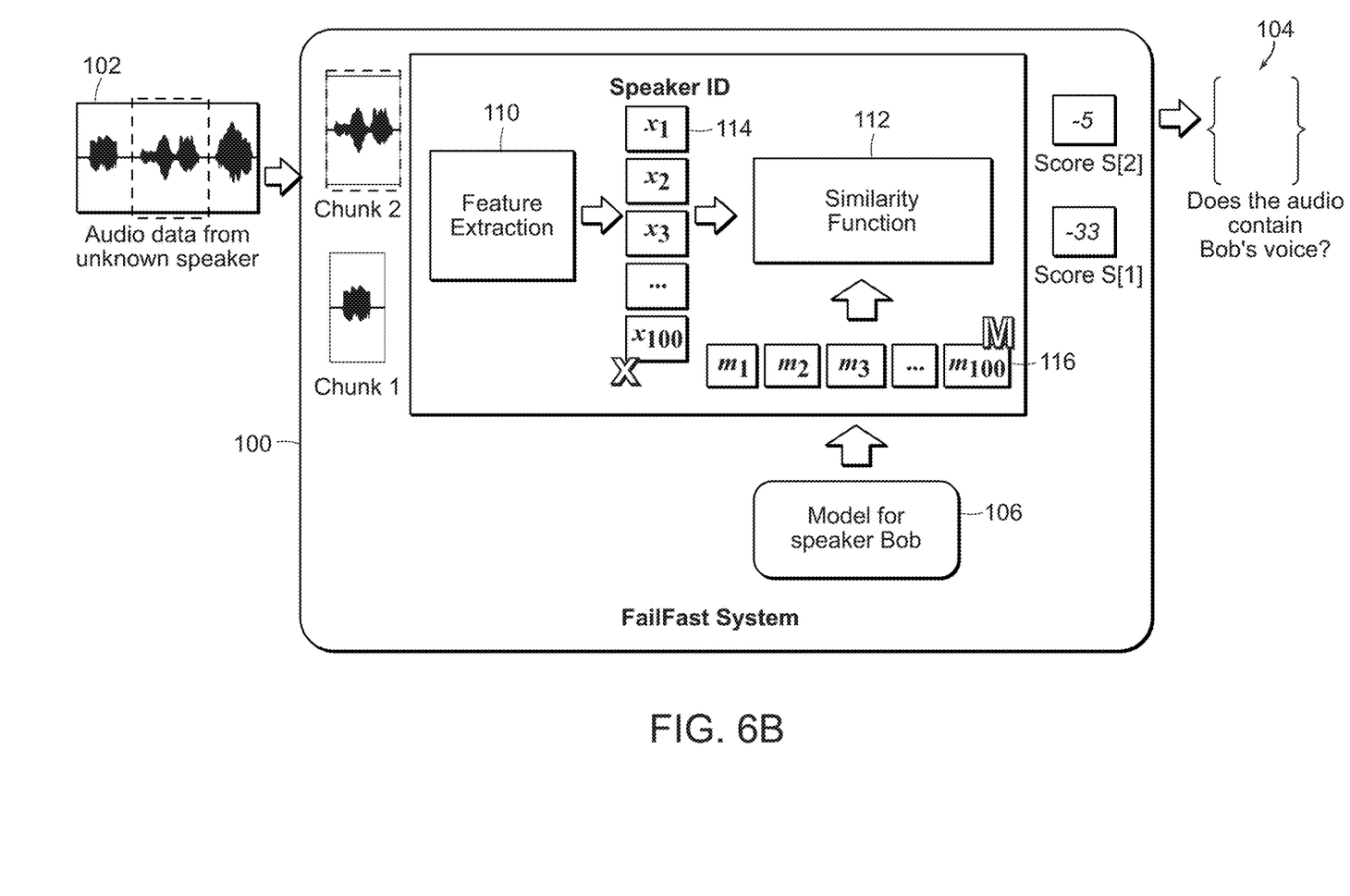
Figure 6C:
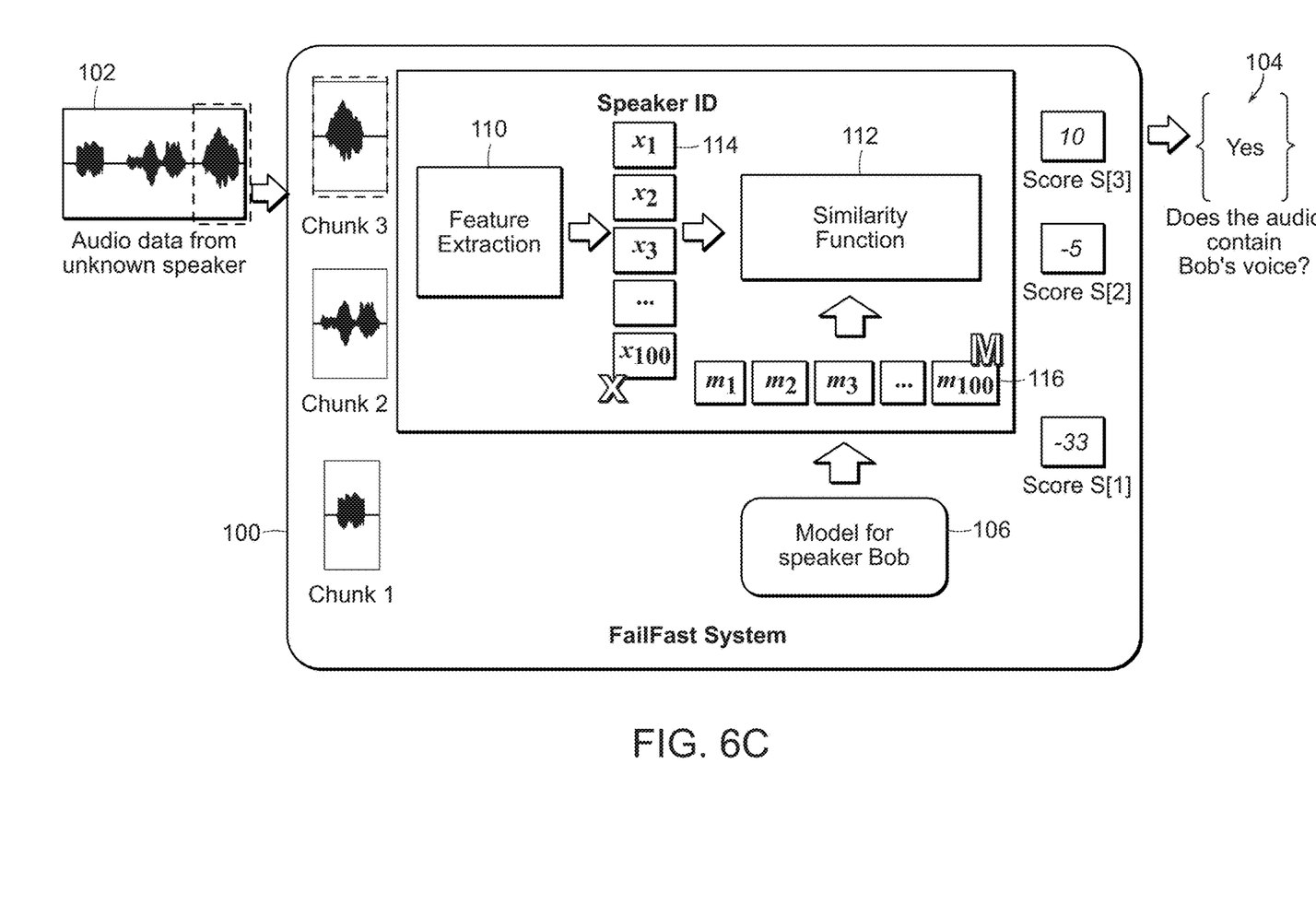
Figure 7A:
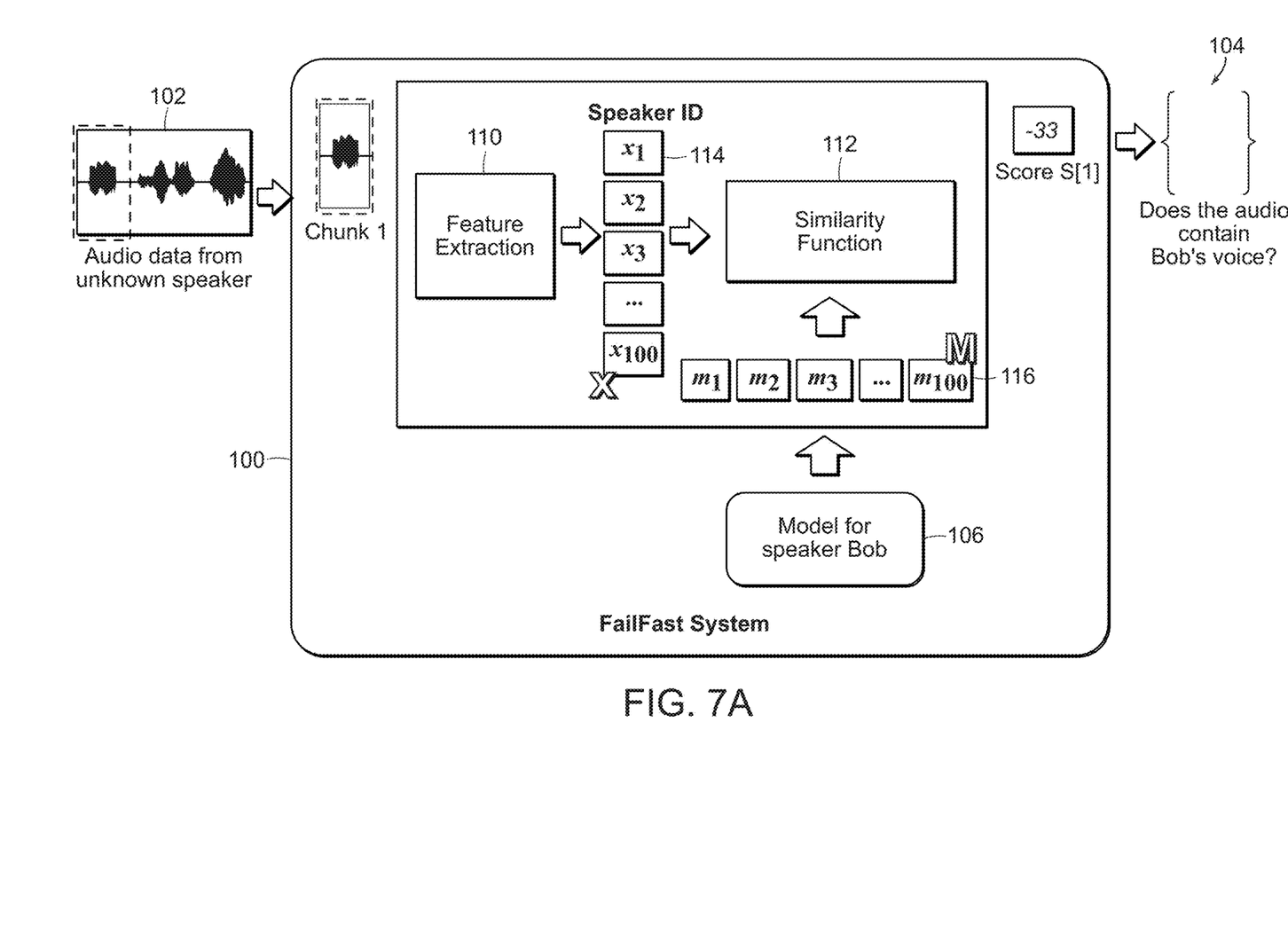
FIGS. 7A through 7B include schematic block diagrams which illustrate a negative identification of a target speaker in unknown audio, according to some exemplary embodiments.
Figure 7B:
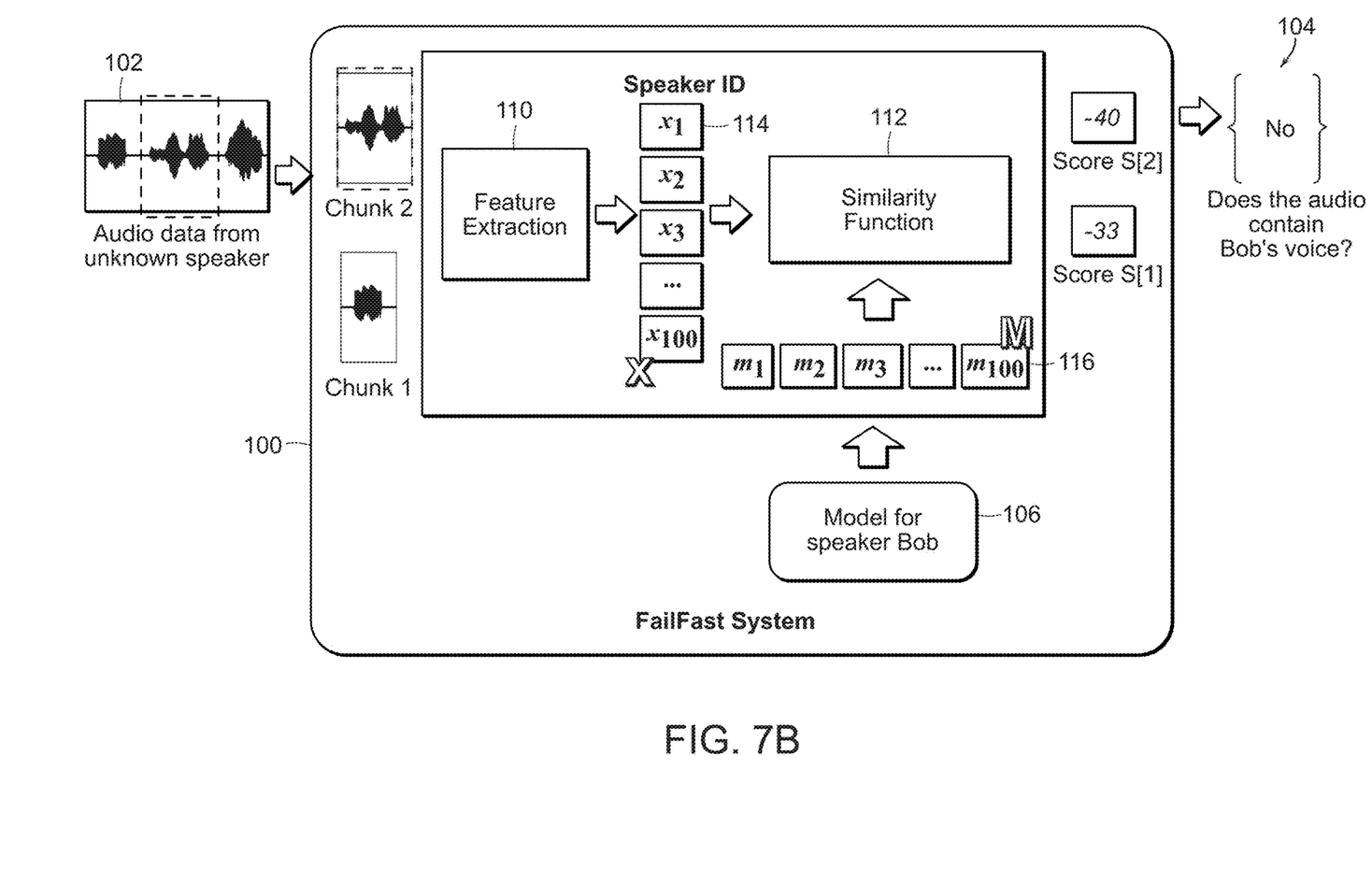

FIGS. 6A through 6C include schematic block diagrams which illustrate a positive identification of the target speaker in the unknown audio, and FIGS. 7A through 7B include schematic block diagrams which illustrate a negative identification of the target speaker in the unknown audio. Referring to FIGS. 6A through 6C, and with continuing reference to the logical flow diagram of FIG. 5, unknown audio 102 is split into three segments or chunks; i.e., for the illustrations of FIGS. 6A through 6C, and of FIGS. 7A through 7B, N=3. FIG. 6A illustrates the processing of the first segment, FIG. 6B illustrates the processing of the second segment, and FIG. 6C illustrates the processing of the third segment. The similarity score for the first segment in FIG. 6A is negative, i.e., −33. The similarity score for the second segment in FIG. 6B is −5, which is greater than −33; therefore, processing continues to the third segment. The similarity score for the third segment in FIG. 6C is 10, which is greater than the score for the second segment. Processing ends here because the third, i.e., $N^{th}$, segment has been processed. Because 10 is a positive number, a YES decision 104 is issued. It should be noted that, in this scenario, if the score for the third segment were negative, for example, −3, a NO decision would have been issued, even though the score increased with each segment.

Continuing to refer to FIGS. 6A through 6C, it should be noted that no decision 104 was issued until all of the data had been processed. That is, all segments were processed to obtain a similarity score, and then the final positive YES decision was issued after all processing was completed. FIGS. 7A and 7A illustrate processing according to which a negative NO decision is reached. In this scenario, the "fail fast" technique of the present disclosure is implemented, resulting in only two of the three segments needing to be processed. That is, the NO decision is reached after only two segments are processed, resulting in reduced use of processing resources.

Referring to FIGS. 7A and 7B, the similarity score for the first segment is −33. The similarity score for the second segment is −40. Since the score decreased from the first to the second segment, loop processing stopped at step S108, and the determination as to whether the score is positive was made in step S112. Since the score for the second segment was negative, the NO decision was issued without all segments needing to be processed.

Hence, the approach of the invention saves considerable processing cost and time because of its ability to eliminate the processing of large amounts of audio data, in the case of a non-identification of a target speaker in unknown audio. In particular, reducing usage of feature extraction module 110 is beneficial, especially since, under operation, that is where the bulk of processing time and cost is expended.

Figure 8:
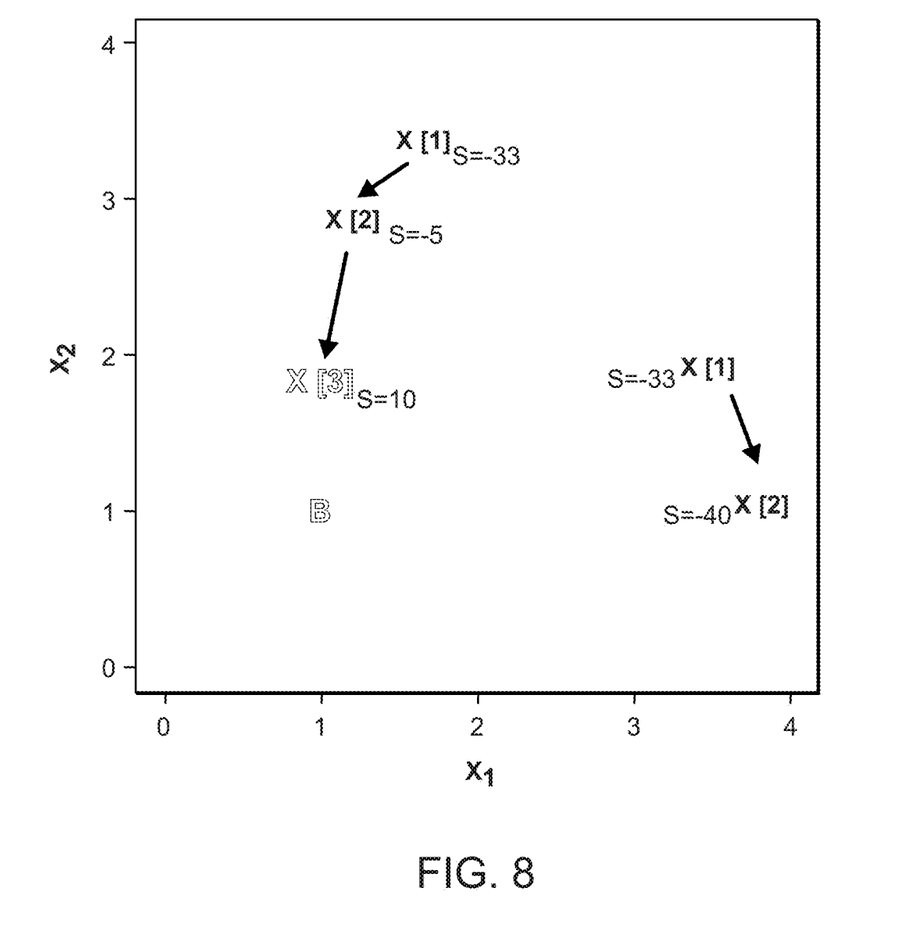
FIG. 8 includes a graph illustrating vectors and trajectory for the two scenarios illustrated in FIGS. 6A through 6C and FIGS. 7A through 7B, according to some exemplary embodiments.

FIG. 8 includes a graph illustrating vectors and trajectory for the two scenarios illustrated in FIGS. 6A through 6C and FIGS. 7A through 7B, according to some exemplary embodiments. Referring to FIG. 8, the trajectory of the scenario of FIGS. 6A through 6C is shown in the path on the left, the trajectory of the scenario of FIGS. 7A through 7B is shown in the path on the right, and the known model vector M is labeled B (Bob), which is shown as a point in the two-dimensional graph. In general, FIG. 8 illustrates that the system of the disclosure, with each chunk of additional data, is refining the representation with more data. For the "YES" scenario of FIGS. 6A through 6C, the feature vector X gets closer to target feature vector B which each chunk. For the "NO" scenario of FIGS. 7A through 7B, more data moves the vector X away from B, so processing can be stopped early.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A system for identifying audio data, comprising:
a feature extraction module for receiving an unknown input audio data stream from a source to be identified and dividing the unknown input audio data stream into a plurality of segments of unknown input audio data; and
a similarity module for receiving the plurality of segments of the unknown input audio data, and for receiving a known audio data stream from a known source, the known audio data stream being divided into a plurality of segments of known audio data each corresponding to a respective segment of unknown input audio, the similarity module performing comparisons between the segments of unknown input audio data and respective segments of known audio data and generating a respective plurality of similarity values representative of similarity between the segments of the comparisons, the comparisons being performed serially, the similarity module terminating the comparisons if the similarity values indicate insufficient similarity between the segments of the comparisons, prior to completing comparisons for all segments of the unknown input audio data, wherein each segment of unknown audio data comprises an unknown data vector comprising a plurality of data values associated with the segment of unknown input audio data; and each segment of known audio data comprises a known data vector comprising a plurality of data values associated with the segment of known audio data.

2. The system of claim 1, wherein the similarity module, in generating each similarity value, computes a vector distance between the unknown data vector and the known data vector of the segments of the comparison being performed.

3. The system of claim 1, wherein the feature extraction module comprises a deep neural network.

4. The system of claim 1, wherein the similarity module performs a probabilistic linear discriminant analysis (PLDA) in generating the plurality of similarity values.

5. The system of claim 1, wherein an extent of each segment is defined by a time duration.

6. The system of claim 1, wherein an extent of each segment is defined by a quantity of data in the segment.

7. A method for identifying audio data, comprising:

receiving, at a feature extraction module, an unknown input audio data stream from a source to be identified and dividing the unknown input audio data stream into a plurality of segments of unknown input audio data; and receiving, at a similarity module, the plurality of segments of the unknown input audio data, and receiving, at the similarity module, a known audio data stream from a known source, the known audio data stream being divided into a plurality of segments of known audio data each corresponding to a respective segment of unknown input audio, the similarity module performing comparisons between the segments of unknown input audio data and respective segments of known audio data and generating a respective plurality of similarity values representative of similarity between the segments of the comparisons, the comparisons being performed serially, the similarity module terminating the comparisons if the similarity values indicate insufficient similarity between the segments of the comparisons, prior to completing comparisons for all segments of the unknown input audio data, wherein each segment of unknown audio data comprises an unknown data vector comprising a plurality of data values associated with the segment of unknown input audio data; and each segment of known audio data comprises a known data vector comprising a plurality of data values associated with the segment of known audio data.

8. The method of claim 7, wherein the similarity module, in generating each similarity value, computes a vector distance between the unknown data vector and the known data vector of the segments of the comparison being performed.

9. The method of claim 7, wherein the feature extraction module comprises a deep neural network.

10. The method of claim 7, wherein the similarity module performs a probabilistic linear discriminant analysis (PLDA) in generating the plurality of similarity values.

11. The method of claim 7, wherein an extent of each segment is defined by a time duration.

12. The method of claim 7, wherein an extent of each segment is defined by a quantity of data in the segment.

* * * * *